United States Patent [19]

Janusz

[11] Patent Number: 5,605,423
[45] Date of Patent: Feb. 25, 1997

[54] SELF-DRILLING STUD

[75] Inventor: Michael Janusz, Elgin, Ill.

[73] Assignee: Elco Textron, In., Rockford, Ill.

[21] Appl. No.: 638,115

[22] Filed: Apr. 26, 1996

[51] Int. Cl.$^6$ .............................. F16B 25/00; E04B 1/38
[52] U.S. Cl. .............................. 411/387; 411/401; 52/699
[58] Field of Search .................................... 411/387, 400, 411/401, 424; 52/699, 700, 704, 707

[56] References Cited

U.S. PATENT DOCUMENTS

| 2,246,457 | 6/1941 | Schultz | 411/401 X |
| 3,372,523 | 3/1968 | Hall, Jr. | 52/699 |
| 4,083,162 | 4/1978 | Regan et al. | 52/699 |
| 4,764,069 | 8/1988 | Reinwall et al. | 411/401 X |
| 5,209,039 | 5/1993 | Boeshart | 52/699 |

*Primary Examiner*—Neill R. Wilson
*Attorney, Agent, or Firm*—Leydig, Voit & Mayer, Ltd.

[57] ABSTRACT

A self-drilling stud particularly suited for use in normal weight or lightweight composite deck system where the use of standard weld studs is inappropriate because of the relatively thin material cross-section of the steel support member. The stud is heat treated to a dual-hardness level so that a portion of the stud is capable of drilling the support member and the decking. The remaining portion of the stud remains relatively ductile so that it can withstand and transfer shear loads imposed by shifting of the concrete slab which overlies the decking to the main support members. The stud is a single piece fastener which includes specially formed annular flanges which enhance interlocking between the stud, the concrete slab and support members.

6 Claims, 2 Drawing Sheets

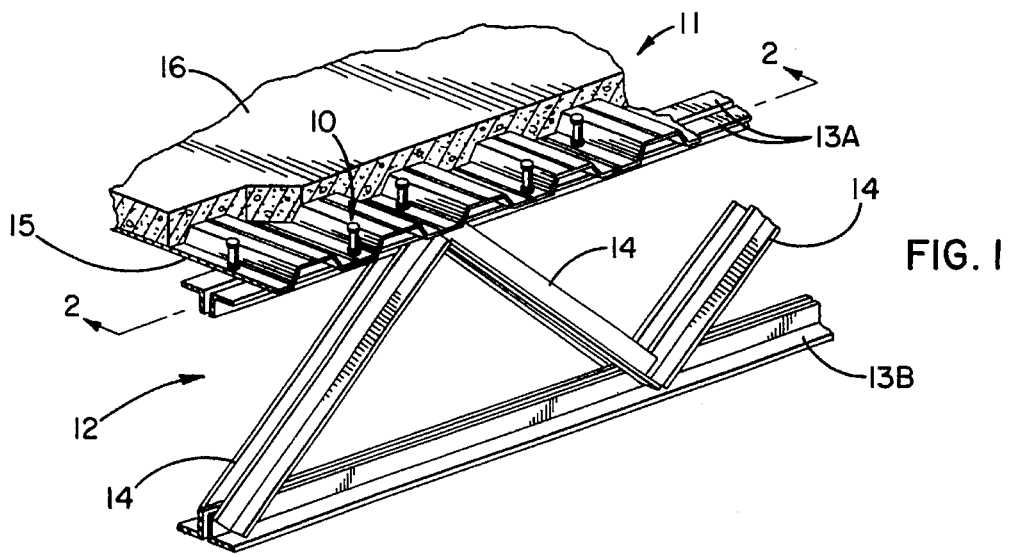
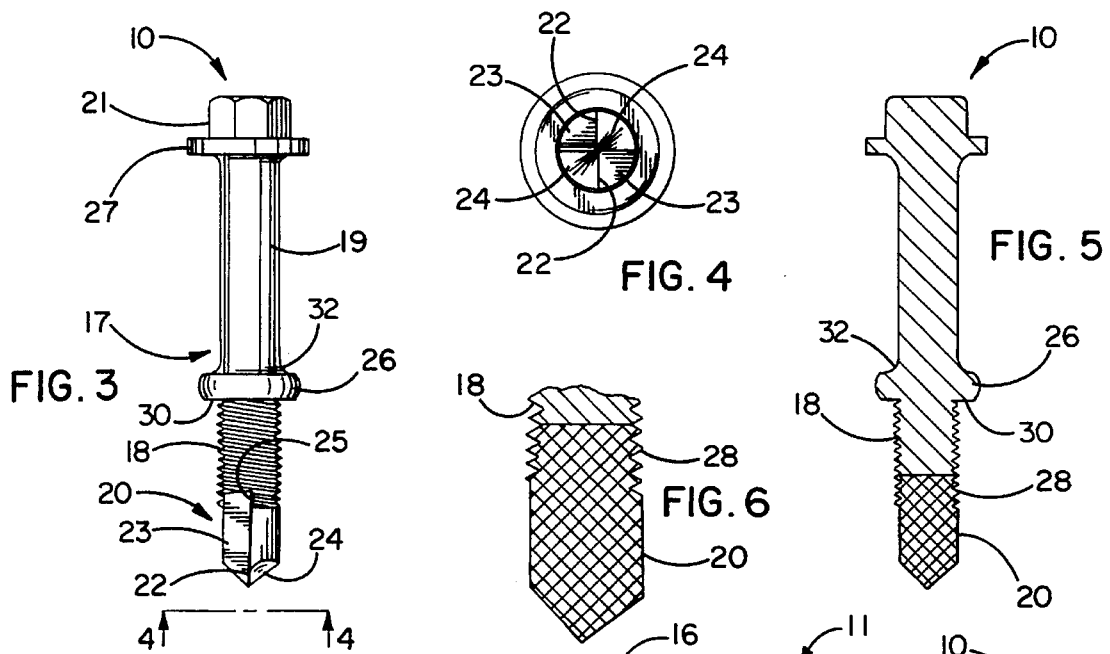
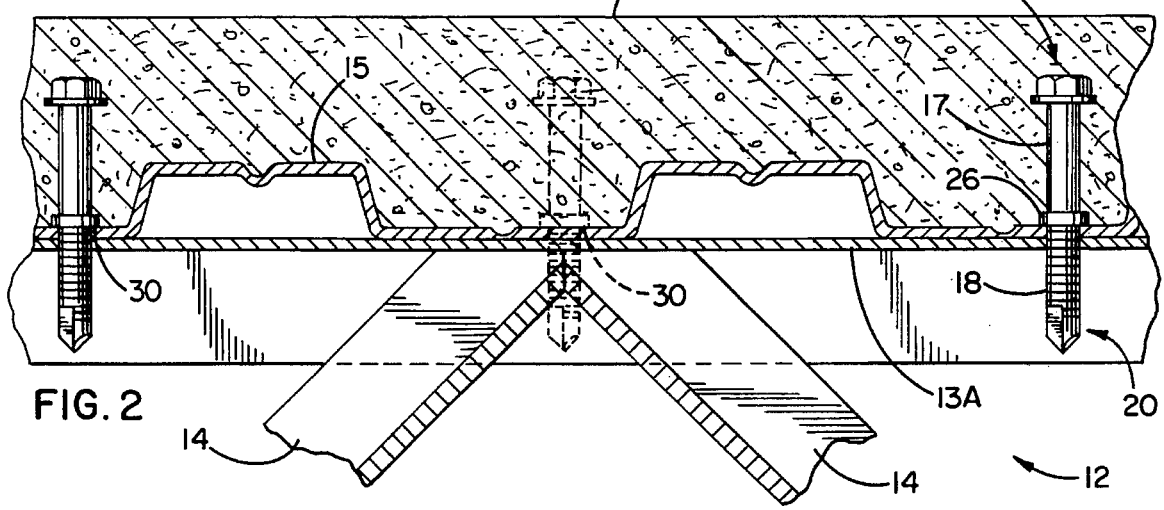

SELF-DRILLING STUD

BACKGROUND OF THE INVENTION

This invention relates generally to fasteners for securing composite decking to a steel supporting structure, and more particularly to a self-drilling fastener for use as a self-drilling stud in lightweight or normal weight composite deck structures which are used as floors or roofs in modern buildings.

During construction of a composite deck, sheets of metal decking, which is often corrugated but can also be flat, are usually fastened to steel structural members. Located along and projecting upwardly from the steel members are metal studs. A concrete slab formed over the steel decking encapsulates the metal studs, so that the studs restrict relative shear movement between the concrete slab and the steel member.

Two general types of studs, weld studs and self-drilling studs, are typically used in a composite deck. Standard weld studs are welded directly to the decking and steel structural members. These studs are ductile so they are suited to restrict the relative shear movement between the concrete slab and the steel. Installation of a weld stud requires that it burn through the decking in order to attach itself to the steel support member. During this process the decking will burn away around the steel weld stud and will typically not attach itself to the support member. This would require a separate attachment operation to attach the deck to the support member.

Further a round ceramic insulator is used at the end of the weld stud during the installation process. it is used in order to concentrate the heat and assist in welding of the stud to the support member. Once the weld stud is attached, the round ceramic insulator needs to be removed from the base of the weld stud, in order for the concrete to encapsulate the stud. At this point the typical way of removing these ceramic insulators is to strike them with a hammer to break them away from the base of the installed weld studs. Since these ceramic insulators are brittle, when broken away from the weld studs they shatter and scatter ceramic pieces over the deck surface. These ceramic pieces need to be removed from the deck surface prior to concrete pour, both for safety reasons and to avoid integration into the concrete mixture and contamination of the concrete integrity. Use of self-drill shear studs does not require the above extra operations.

In the process of stud welding through the decking the protective deck coating is damaged from the intense heat produced, rendering it susceptible to corrosion. Typical recommended practice is to apply a protective coating to the bare or damaged decking material to reduce corrosion effects. Use of self-drill shear studs does not require the above extra operation.

Due to the nature of the weld joint between the stud and the steel, the diameter of the weld stud establishes a minimum material thickness that is required for the structural member. The smallest weld studs that are presently commercially used establish a lower limit on the material thickness of the structural member that can be used with those weld studs. The smallest diameter weld stud currently available is ½" diameter which requires a minimum of 0.200" thick steel. If steel thicknessies less than 0.200" usually encountered in typical bar joist construction, the weld stud is not recommended. Self-drilling shear studs present an alternative in these applications.

Self-drilling studs are thus an attractive alternative to weld studs for use in composite decks. Self-drilling studs do not limit the minimum material thickness of the structural member. In addition, self-drilling studs secure the decking to the steel, thereby eliminating the separate attachment needed with the use of weld studs. Self-drilling studs also avoid other problems with weld studs, such as the removal of the ceramic insulator from the stud after its installation, and the cleanup of ceramic pieces which are occasioned by the removal. The decking is not damaged, and indeed, the need to repair the metal decking and attach it to the stud or the metal support is eliminated. Use of a self-drilling stud does not create a damaged area of the decking which must be repaired and instead, when properly installed provides a means for attaching the deck to the steel member. However, in order for the self-drilling studs to be capable of drilling the steel, the self-drilling studs must be heat treated to a relatively high degree of hardness. This standard processing results in the reduced ductility, and ductility is necessary in the self-drilling stud to transfer the shearing movement in the composite deck system. Some self-drilling studs have attempted to compensate for this basic deficiency by isolating the stud from the concrete with a spacer. The spacer attempts to convert the shearing action of the concrete slab into a bending moment which the hardened stud is more adept at resisting. However, it does not change the non-ductile nature of the self-drilling studs themselves.

SUMMARY OF THE INVENTION

The general aim of the present invention is to provide a new and improved one-piece self-drilling stud for use in a composite deck system where the use of standard weld studs is inappropriate because the material cross-section of the steel member is less than accepted practice.

A more detailed objective is to achieve the foregoing by heat treating the stud to a dual-hardness level so that a portion of the stud is capable of drilling the steel while the remaining portion of the stud is sufficiently ductile to transmit the shearing forces in a composite deck system to the main structural members.

An even more specific objective is to achieve the foregoing by heat treating a drill point, cutting threads and lead threads in the self-drilling stud to a relatively high degree of hardness while maintaining the remainder of the stud in a relatively ductile condition.

Another general aim of the invention is to provide for enhanced interlocking between the self-drilling stud and the concrete slab in a composite deck system.

It is a feature of the invention that a self-drilling stud is provided with an integral flange which automatically establishes the height of the portion of the stud that is encapsulated in the concrete slab for proper concrete cover, which secures the decking to the steel, and which is shaped to transmit shearing loads.

A further feature is the provision of a self-drilling stud with a second integral flange which is located near the driving head of the stud and which interacts with the concrete to limit deflection of the steel. This feature can be enhanced by use of a self-drilling shear stud composite nut in conjunction with the shear stud when used with thin steel structural members.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a typical composite deck structure utilizing new and improved self-drilling studs incorporating the unique features of the present invention.

FIG. 2 is a enlarged fragmentary cross-sectional view taken substantially along the line 2—2 of FIG. 1.

FIG. 3 is an enlarged side view of one of the studs shown in FIGS. 1 and 2.

FIG. 4 is an enlarged bottom view of the stud as seen along the line 4—4 of FIG. 3.

FIG. 5 is a cross-sectional view taken axially through the stud of FIG. 3, the cross hatch patten representing an area of the stud that is heat treated to a relatively high degree of hardness.

FIG. 6 is an enlarged view of the drilling and drilling end of the stud shown in FIG. 5.

Figure 7:
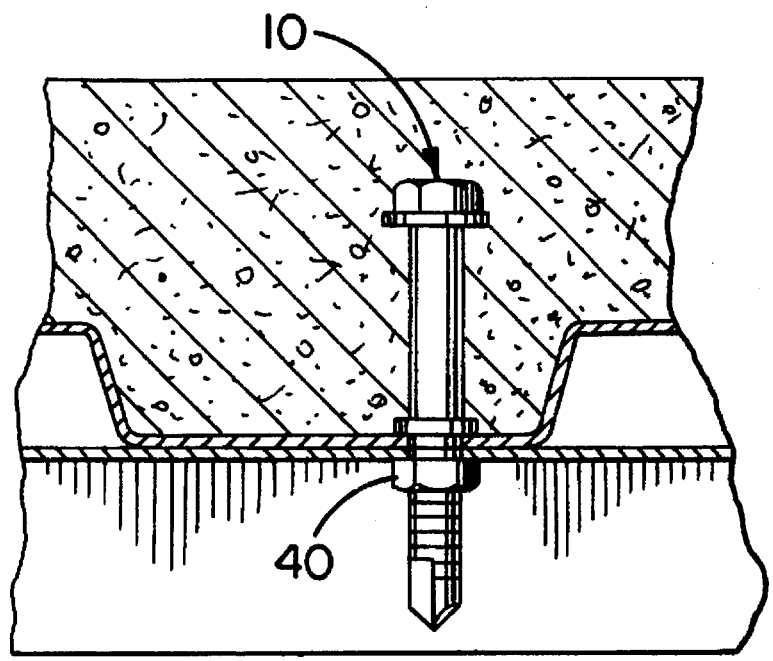
FIG. 7 is a partial view, similar to FIG. 2, showing a modified version of shear stud in an installation suitable for light weight steel structural members.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention is shown in the drawings as embodied in a self-drilling fastener 10 (FIG. 1) which is especially useful as a self-drilling stud in composite deck structures 11 which are used as floors or roofs in modern buildings. A floor or roof deck is subject to shear forces which tend to cause a horizontal, or shearing, movement of the deck relative to its support structure. The self-drilling stud 10 of the present invention restricts and transfers this shearing movement when used in a composite deck system.

A composite deck 11 is typically fabricated at a building site. During construction of the building, metal secondary structural members 12, such as joist or beams, but not restricted thereto, are joined to the building structural support beams (not shown). The metal structural members will sometimes be referred to herein as metal joists, with such term being used in its broadest sense as a general characterization of metal secondary structural members. When steel joists are used they are typically comprised of vertically spaced upper and lower elongated horizontal members 13A and 13B, and further comprise supporting web members 14 joined to and extending between the horizontal members 13A and 13B. In light weight composite deck systems, the joist members are formed with material cords having a relatively thin cross-section (e.g., less than 0.200"). Metal decking 15 is typically laid over and spans adjacent joists so that corrugations, if present, run at a right angle to the joists, although the composite deck may be fabricated without corrugated decking. Located in and projecting upwardly from the upper members 13A of the joists and through the corrugated decking are the self-drilling studs 10.

A concrete slab 16 is poured over the corrugated decking, encapsulating the upper portion of the studs.

Each self-drilling stud 10 (FIG. 3) has an elongated shank 17 with an integral threaded portion 18 having helical threads, and an unthreaded portion 19. Projecting from the lower end of the threaded portion is a fluted drill tip 20. Located at the end of the stud opposite the drill tip is a driving head 21. The driving head is formed to engage a driving tool which is capable of rotating the stud, such as but not limited to the hex-shaped driving head shown in FIG. 3 and a hex-shaped socket driver, or any of the many other well known rotational driving means. The driving tool is then used to drive the drill tip and threaded portion of the stud through the valleys of the corrugated decking 15 (FIG. 2) and the upper members 13A of the steel joist 12.

The drill tip 20 is defined by two metal cutting edges 22 and two flutes 23. The two flutes extend upwardly from the end of the stud and into the first few helical threads in the threaded portion 18. Two beveled faces 24 are milled on the end of the tip at an angle projecting upwardly and outwardly from the center of the stud. The two beveled surfaces are diametrically spaced around the end of the stud (FIG. 4). The two flutes 23 are also diametrically spaced and begin approximately 90 degrees rotated from the beveled surfaces. The cutting edges 22 of the drill tip are defined by the sharp edges created at the intersection of the flutes and the beveled surfaces and are located at the six o'clock and twelve o'clock positions when the stud is viewed as in FIG. 4. The cutting threads 25 (FIG. 3) of the self-drilling stud 10 are defined by the first few threads which are opened by the flutes that extend into the threaded portion 18 adjacent the drill point.

In accordance with the present invention, the self-drilling stud 10 (FIG. 2) is selectively heat treated to a dual-hardness level so that the lower portion of the stud has a relatively high degree of hardness to enable it to drill and tap the decking 15 and steel member (i.e. joists) 12, while the remaining portion of the stud is heat treated to a lesser degree of hardness so that it remains relatively ductile and capable of resisting and transmitting the shearing forces of the concrete slab 16, generally directed left or right, relative to the support. In addition, the self-drilling stud is uniquely constructed so that it correctly positions itself in and enhances interlocking with the concrete slab, in addition to establishing correct concrete slab cover.

More specifically, an integral annular flange 26 is located between the threaded and unthreaded portions 18 and 19 of the stud 10. During construction of the composite deck 11, the lower portions of the self-drilling studs 10 (FIG. 2) are driven through the valleys of the decking 15 and through the upper horizontal members 13A of the steel joists 12. When each stud is tightened, the bottom of the flange 26 engages the decking 15, thereby clamping the decking to the underlying horizontal joist member. The flange 26 provides positive localized clamping which is found to be quite effective in these applications. In addition, the flange 26 adds stability to the tightened stud and positions the height of the driving head 21 relative to the horizontal joist member, thereby defining the portion of the stud that will be encapsulated in the concrete slab 16, for correct concrete cover requirements above the stud.

The shape of the flange 26 is of particular significance. A lower surface 30 is substantially flat and joins the threaded shank portion 18 at a reasonably sharp right angle. When the stud is drilled into place as shown in FIG. 2, the lower surface 30 will securely clamp the top side of the decking to the underlying joist.

In contrast to the flat and sharply angled lower side, the upper side of the flange 26 is smoothly radiused as at 32 to flare slowly from the angular flange to the upstanding shank. It is found that the curved or radiused junction is important to prevent cracking of the stud when subjected to bending loads. The curved shape may also tend to distribute the shear forces, particularly when the concrete deck itself has a significant component loading the flange against the corrugated decking and joist.

A second integral annular flange 27 (FIG. 3) is located directly below the driving head 21, between the driving head and the unthreaded portion 19 of the stud 10. The flange 27 is larger in diameter than flange 26.

When a shearing force acts on the upper portion of the stud 10 which is encapsulated in the concrete slab 16 (FIG. 2), the unthreaded portion 19 of the stud tends to bend, in a cantilever fashion, about the center of the lower flange 26, thereby tending to pivot the driving head 21 and the upper flange 27. As the upper flange 27 and the driving head try to pivot in the concrete, the concrete surrounding the upper flange 27 and the driving head responds with a restoring force couple. This force couple is applied to the lower side of the flange 27 opposite the shearing force and to the upper side of the flange 27 and driving head on the side of the shearing force, thereby tending to reduce the deflection of the stud in response to the shearing force. In this manner, the relatively large diameter flange 27 enhances the structural interlocking between the stud and the concrete slab. This same force couple also has the effect of creating an upwardly directed force on the stud at the underside of the top flange 27, which tends to act through the threaded section to reduce the lower cord deflection of the joist into which the stud is threaded.

FIG. 7 illustrates a modified version of a shear stud according to the invention particularly suitable for light weight steel structural members. In the embodiments described thus far, the shear stud relies on threaded engagement with a steel structural member for retention to the decking system. However, when the secondary steel support is rather thin, an auxiliary means of retention can be useful. FIG. 7 shows a shear stud 10 constructed in the same manner as the shear studs of the prior embodiments, but associated with a retention member 40 intended to increase the resistance of the stud to pullout from the steel support. The retention member 40 is a special designed composite nut adapted for use with the shear stud 10. The shear stud 10 is installed in the decking system as in the case of prior embodiments. However, either before or after pouring of the concrete deck, a workman will access the array of shear studs from below the deck and apply a nut 40 to the threaded portion of the shank which projects through the decking and secondary structural support. The nut 40 can be applied with a conventional power nut driver, in a relatively simple operation where the workman simply proceeds along the line of studs, from stud to stud, applying special nuts to each. The presence of the nut 40 in connection with the thin structural member will significantly increase the pullout force from the stud and provide significant assistance in transmitting shear loads from the deck to the structural member.

In carrying out the invention, the self-drilling stud 10 is heat treated to a dual-hardness level with a Drill-Flex® heat treating process developed by Elco Industries, Inc., Rockford, Ill. Specifically, the lower portion of the self-drilling stud, as shown in FIGS. 5 and 6 by cross hatch, comprising the drill tip 20 and a minority of turns 28 of the threaded portion 18 including the cutting threads 25 and a few lead threads adjacent the cutting threads is heat treated to a relatively high hardness so that it is capable of effectively drilling and tapping the decking 15 and the upper horizontal joist member 13A. The remaining portion of the self-drilling stud, i.e., the driving head 21, the unthreaded portion 19, the annular flanges 26 and 27 and the remaining threaded portion 18 which engages the joist member and is adjacent the annular flange 26, is heat treated to a lesser degree of hardness so that it remains relatively ductile and capable of resisting and transmitting the shearing forces of the floor or roof secondary members to the main structural supports without failure. By way of example, the lower portion of the stud is hardened to 50 minimum Rockwell C while the remaining portion of the stud is hardened to 50%–70% of drill tip. An example not required with the above explanation.

From the foregoing, it will be apparent that the present invention brings to the art a new and improved unsheathed self-drilling stud 10 for use in lightweight or normal weight composite decks 11 where the use of standard weld studs is precluded. In addition, the ability of the self-drilling stud 10 to resist and transfer shear forces in a composite deck is enhanced over prior self-drilling studs by virtue of the dual-hardness levels embodied in the stud and the provisions of the integral flange 27 which enhances interlocking between the stud and the concrete slab 16 and secondary and primary structural members. Also installation advantages over weld studs.

I claim:

1. A single piece fastener for use in a supporting structure for a concrete slab, the supporting structure being of the type which includes a plurality of metal support members secured to the concrete slab at a plurality of spaced locations by a plurality of said fasteners, each said fastener comprising:

a threaded portion having first and second ends and a helical thread, a fluted drill tip projecting from said first end of said threaded portion and located at a first end of said fastener, the fluted drill tip and lead turns of the helical threaded portion having a relatively high hardness so that said drill tip and lead threads are sufficiently hard to penetrate and tap threads in support members of the type used in the supporting structure, a first relatively smaller integral annular flange located above the threaded portion, and having a straight stud projecting from the flange opposite the threaded portion, a second and comparatively larger annular flange located atop the stud, and a driving means located atop the second annular flange for allowing engagement by a tool to rotate the fastener for securing same in a support member of the type used in said supporting structure, an upper section of the fastener including the first annular flange and threads of the threaded portion which are adapted to be in threaded engagement with a support member being hardened to a lesser degree of hardness than the drill point to render the upper section of said fastener substantially more ductile than the drill tip and lead threads, the length of the fastener between the first and second flanges being less than the desired thickness of the concrete slab so that the second annular flange when installed in a deck will be encased in the slab with the second annular flange resisting and transmitting shear forces which might be imposed by the slab onto the supporting structure, and the lesser degree of hardness being at a level which imparts sufficient ductility to the portions of the fastener intended to project above the support member to resist and transmit shear loads imposed by the concrete deck attempting to shift on its supporting structure.

2. A single piece fastener as defined in claim 1 in which the first annular flange has a relatively flat bottom and a smoothly radiused top fairing gently into the straight stud portion so as to resist cracking under shear.

3. A single piece fastener for use in a composite deck of the type having metallic members supporting decking which in turn supports a poured concrete slab, the fasteners being of the type intended to penetrate the decking to seat in the underlying member, and providing an upstanding stud intended to be encased in the concrete of the slab, each of said fasteners comprising:

(a) an elongated shank having an unthreaded portion and an integral threaded portion with a helical thread;

(b) a fluted drill tip integral with and projecting from said threaded portion of said shank;

(c) a first annular flange integral with said shank between the threaded and unthreaded portions thereof;

(d) a driving head integral with said unthreaded portion of said shank on the end thereof opposite said drill tip; and (e) a second annular flange integral with said unthreaded portion of said shank immediately adjacent said driving head; the drill tip and a selected minority of turns of the thread immediately adjacent the drill tip of each stud being hardened to a relatively high degree of hardness to enable said tip and said selected turns to drill and tap said decking and one of said members whereby said stud may be secured to said decking and said one member by tightening said stud with said driving head until said first flange engages said decking, and the remaining portion of each stud being hardened to a lesser degree of hardness than said drill tip and said selected turns of said thread thereby to leave the remaining portion of said stud relatively ductile and capable of restricting and transferring shear loads to support members.

4. A single piece fastener as defined in claim 3 in which the diameter of said first flange is less than the diameter of said second flange.

5. A single piece fastener as defined in claim 4 in which the first flange has a substantially flat underside which is adapted to create a force clamping the decking to the support member when the fastener is threaded into the support member, and a radiused upper surface smoothly fairing into the shank and shaped to resist cracking under shear loading.

6. A single piece fastener is defined in claim 3 in which there is further provided a threaded nut of a size which fits the threaded portion of the shank, and adapted to be applied to the shank after the stud is secured to the decking and the member.

\* \* \* \* \*